Oct. 4, 1955  H. NERWIN ET AL  2,719,679
MEANS FOR ENGAGING PHOTOGRAPHIC FILM TO CONNECT
THE FILM TO THE SPOOL OR CORE OF A CASSETTE
Filed Sept. 23, 1952  2 Sheets-Sheet 1

INVENTORS
HUBERT NERWIN
& JOHANNES G. PADELT
BY
ATTORNEY

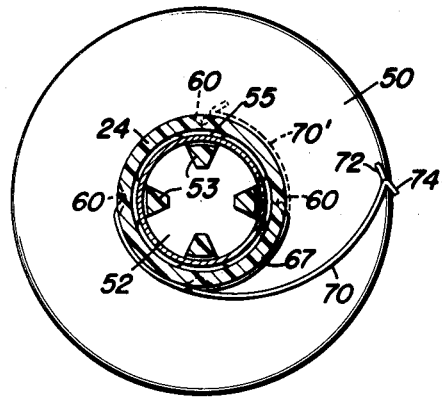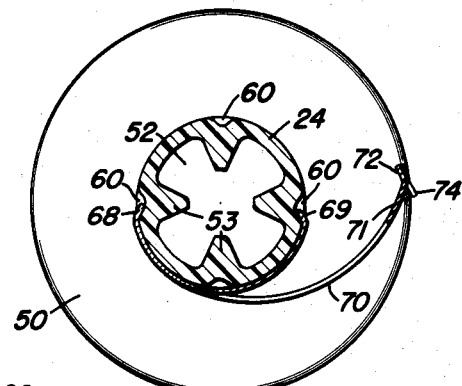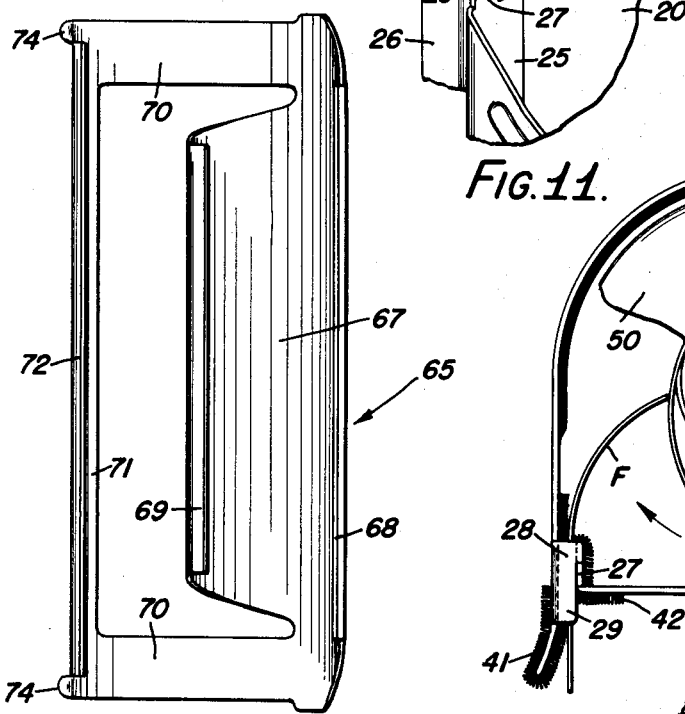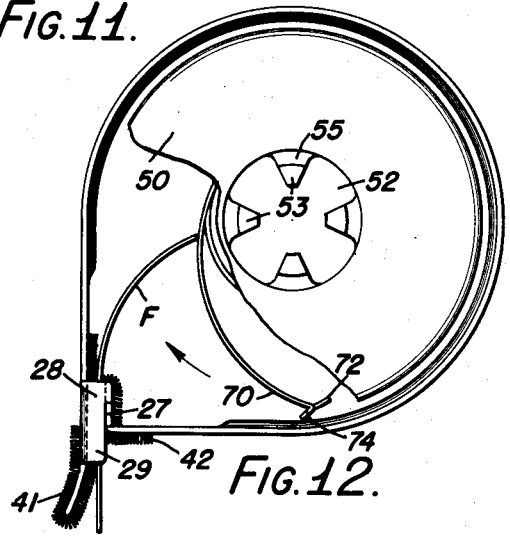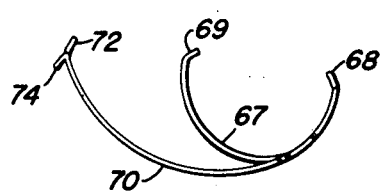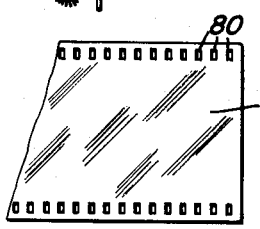

United States Patent Office 2,719,679
Patented Oct. 4, 1955

2,719,679

MEANS FOR ENGAGING PHOTOGRAPHIC FILM TO CONNECT THE FILM TO THE SPOOL OR CORE OF A CASSETTE

Hubert Nerwin, Irondequoit, and Johannes G. Padelt, Rochester, N. Y., assignors to Graflex, Inc., Rochester, N. Y., a corporation of Delaware Application September 23, 1952, Serial No. 311,081

8 Claims. (Cl. 242—71)

The present invention relates to a film holding cartridge for use in photographic cameras. In a more particular aspect the invention constitutes an improvement over the film cartridge of pending U. S. patent application Serial No. 218,230, filed March 29, 1951, now Pat. No. 2,662,696.

One object of the present invention is to provide a film-holding cartridge or cassette which will be light-tight and which therefore can safely be placed in or removed as a unit from a camera, even in daylight, with a new or an exposed roll of film therein.

A further object of the invention is to provide an improved film cartridge or cassette in which better sealing is obtained.

Another object of the invention is to provide a film-holding cartridge or cassette of the character described which will be light-tight so that it may serve as a package in which a roll of exposed film may safely be shipped to a point where it can be developed.

Another object of the invention is to provide a film-holding cartridge or cassette into which the lead end of a roll of film can easily and quickly be threaded, even in the dark, and which is, therefore, especially suitable for military use.

Another object of the invention is to provide means for easily and quickly connecting the lead end of a roll of film to the core or spool of a film cartridge or cassette to facilitate winding the film upon the core or spool when the film is fed into the cartridge or cassette.

Another object of the invention is to provide improved means for engaging the lead end of a roll film strip, when the film strip is fed blindly into the cartridge or cassette, so that upon turning of the winding key or drive shaft of the camera the film will be wound upon the take-up spool or core.

A further object of the invention is to provide a film cartridge or cassette so constructed that upon insertion of the lead end of the film into the cartridge or cassette and upon rotation of the spool of the cassette the lead end of the film will automatically be engaged by the core or spool mounted within the cartridge or cassette and will be wound upon the core or spool upon rotation thereof.

Another object of the present invention is to provide an improved film-holding cartridge or cassette of the type described containing a spool on which the film may be wound so that the film will more adequately be protected against "end-fogging" by the end flanges of the spool.

Another object of the invention is to provide a film-holding cartridge or cassette of the character described so constructed that the spool can be quickly coupled to or disconnected from the driving key or driving mechanism of a camera to permit quick insertion into the camera of a new cartridge or cassette with a new roll of film, as well as quick removal from the camera of a cartridge or cassette containing a roll on which exposed film has been wound.

Still another object of the invention is to provide a film holding cartridge and a spool therefor of the character described which is easy to make and which can be manufactured on a production basis at a relatively low cost.

Other objects of the invention will be apparent hereinafter from the specification and from the recital of the appended claims.

In the drawings:

Fig. 7 is a section on the line 7—7 of Fig. 1, looking in the direction of the arrows;

Fig. 8 is a section on the line 8—8 of Fig. 1, looking in the direction of the arrows;

Fig. 9 is a view looking at the clip or hook from the inside thereof;

Fig. 10 is a plan view of the clip or hook;

Fig. 11 is a fragmentary perspective view, looking at one end of the body of the cartridge;

Fig. 12 is an end view of the cartridge with one of the caps removed and showing the lead end of the roll of film being threaded into the cartridge; and Fig. 13 is a fragmentary view showing the type of film adapted to be used with the film cartridge of the present invention.

Figure 1:
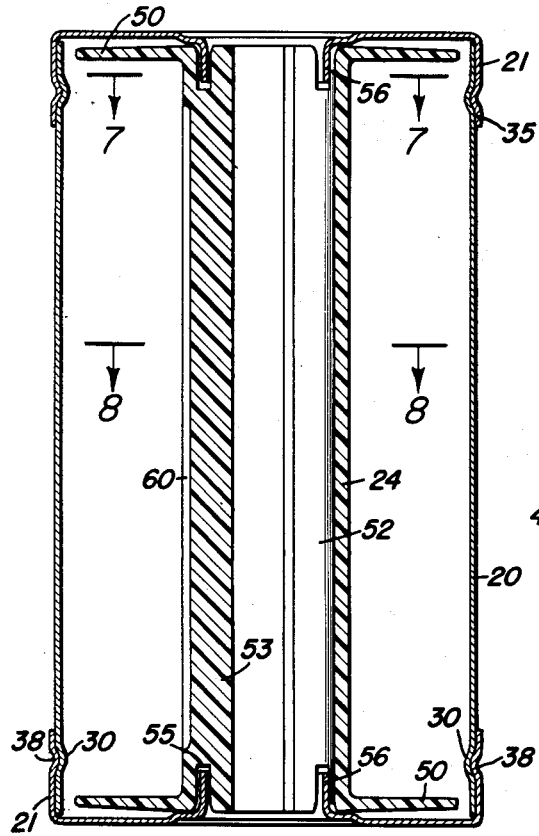
Fig. 1 is an axial section of a film holding cartridge made according to one embodiment of this invention.

Referring now to the drawings by numerals of reference, 20 denotes the body portion of our cartridge, 21 are the end caps for the cartridge; and 24 is the film spool.

Figure 4:
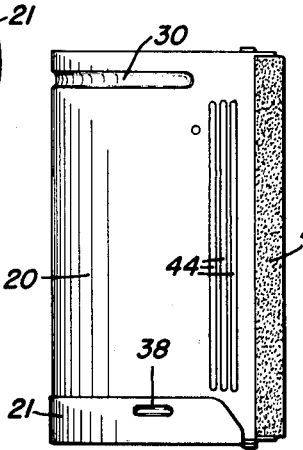
Fig. 4 is a side elevation of the cartridge, also on a reduced scale, and showing one cap removed therefrom.

The body portion 20 of the cartridge is made of a thin sheet, such as aluminum, and is flexible. It has an axially extending mouth or opening for passage fo film into and out of the cartridge. This mouth or opening is defined and bounded by an inturned portion 25 (Fig. 11) and by a portion 26, which is generally parallel to the portion 25, when the cartridge is closed, and which is flared somewhat outwardly at its extreme end so as to permit ready introduction of the film into the mouth of the cartridge. The lip or bounding portion 25 of the body is provided with integral lugs 27 at its opposite ends which project axially beyond the rest of the body portion of the cartridge. The lip portion 26 is provided at opposite ends with inwardly turned tabs or flanges 28. Each tab or flange 28 is cut away, as shown in Fig. 11, at 29 to provide a seat for one of the lugs 27. Near its opposite ends, the body portion 20 is crimped, as denoted at 30 (Fig. 4), to provide parallel arcuate grooves which extend around the major portion of the body.

The caps 21 of the cartridge are also made of a suitable metal, such as aluminum. The caps are made preferably identical with one another so that they may be interchangeable. Each cap 21 is generally pear-shaped in cross-section and has a skirt portion 35 around its periphery. The top of each cap is notched and the skirt portion 35 thereof is cut away, as denoted at 36 in Fig. 5, to receive a lug 27 of body 20. The skirt portion 35 of each cap is provided with three equi-angularly spaced teats 38 (Fig. 4), formed by crimping, which are adapted to engage in either of the recesses 30 of the body to hold the cap on the body portion 20.

Figure 2:
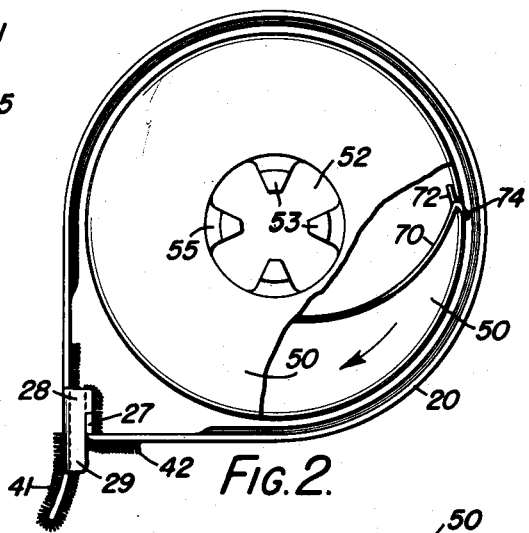
Fig. 2 is an end view of this cartridge, with one of the caps removed, and with part of the upper flange of the spool broken away to show the film-engaging hook or clip.
Figure 5:
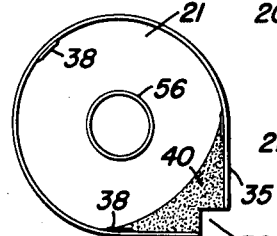
Fig. 5 is a view on a reduced scale, looking at the inside of one of the end caps of the cartridge.

Both caps are lined with plush 40 on their inside around the notch 36, as shown in Fig. 5. Strips of plush 41 and 42 (Figs. 2 and 12) are glued around the lips 25 and 26 of the body portion of the cartridge to further insure light-tightness of the cartridge in use. Corrugations 44 (Fig. 4) may be formed in the body portion 20 adjacent lip 26 for strength.

Figure 3:
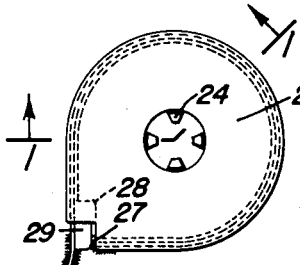
Fig. 3 is an end view of the cartridge, on a somewhat reduced scale, showing the cap in position.

When the caps are pushed over the ends of the body portion the teats 38 on the caps snap into the grooves 30 of the body portion to securely hold the caps on the body portion, and the skirts 35 of the caps compress and confine the body portion. At the same time the caps force the lugs 27 of the body portion against the seats 29 (Fig. 11) formed on the flanges 28 of the body portion. Since the flanges 28 are long enough to extend under the top portions of the caps, when the caps are on the body portion, as shown in Fig. 3, and since the caps hold the lugs 27 against the seats 29 of the flanges, the caps insure light-tightness of the cartridges.

As previously stated the cartridge is adapted to contain and support a spool 24. The spool 24 is formed with integral end flanges 50 at opposite ends. It has a bore 52 (Fig. 1) extending through it that is generally cross-shaped in cross-section, as shown in Figs. 2, 7, 8, and 12, the spool being provided with four internally projecting splines 53 which bound and shape its bore. The splines 53 of the spool are formed with circular recesses or grooves 55, as shown in Figs. 1, 2, 7 and 12; and each cap 21 has a central circular opening which is bounded by a central circular flange 56 that is engageable in one of the end recesses 55 of the spool. The flanges 56 are concentric with the bore of the spool; and they serve as bearings on which the spool rotates and also as light-traps for the spools.

Because of the central openings in the caps and because of the bore 52, the spool is accessible from either end and can be engaged at either end with the driving key of the camera in which the cartridge is being used; and because the bore 52 is cruciform in cross section the key can be engaged with the bore in different positions at 180° apart. All this permits of quickly engaging the driving key of the camera with the spool when the cassette is inserted in the camera.

Figure 6:
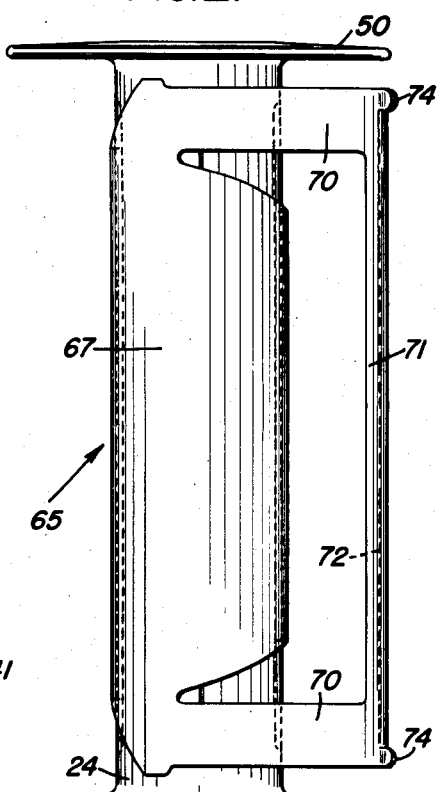
Fig. 6 is a side elevation on the scale of Fig. 1, of the spool of the cartridge, showing the film-engaging hook or clip.

The spool is formed on its periphery with four axially extending recesses or grooves 60 (Figs. 1 and 8) which are equi-angularly spaced around the periphery of the spool. A very thin hook member 65 (Figs. 6, 7 and 10) made of annealed strip spring steel, for instance, is adapted to be secured to the spool. This clip or hook member 65 is stamped to provide a body portion 67 which is formed with a slightly smaller radius than the radius of the periphery of the spool 52 and which has inturned ends 68 and 69 that may be engaged in any two diametrically-opposed grooves 60 of the spool. When the hook or clip member 65 is snapped over the periphery of the spool, it will be held, therefore, resiliently in clamping engagement with the periphery of the spool by the inturned portions 68 and 69.

In the stamping operation in forming the hook member, there are two parallel arms 70 stamped out integral with the body portion 67 of the hook member. These are joined together at their free ends by an integral connecting strip 71. The strip 71 has an inturned portion 72 which is adapted to engage in one of the grooves 60 of the periphery of the spool.

In forming the hook member the arms 70 are shaped normally to extend on an arc of larger radius than the body portion 67 of the hook member, so that the arms 70 extend normally resiliently away from body portion 67, as shown in Fig. 10. When film is wrapped around the hook member, however, the arms 70 are pressed against the spool so that the turned-in portion 72 thereof engages in a recess 60 of the spool. The hook member from inturned portion 68 to inturned portion 69 is adapted to embrace in resilient clamping engagement approximately 180° of the periphery of the circumference of the spool; and the hook member between inturned portion 68 and inturned portion 72 embraces, when the arms 70 are pressed against the spool by film wound over the arms, an arc equal to substantially three-fourths of the circumference of the spool. The arms 70 have out-turned hooks 74 formed on them adjacent opposite ends of the hook member which are spaced apart a distance equal to the distance between the two rows of perforations 80 in the film F (Fig. 13) which is used in the camera for which the film cartridge is adapted.

In use, it is easy to quickly assemble the cartridge. The body portion 67 of the hook member can quickly be snapped into position with the in-turned portions 68 and 69 engaging in two of the recesses 60 of the spool that are spaced 180° apart. Then one end of the spool is seated on the flange 56 of one of the caps 21, which may already have been assembled on the body portion 20 of the cartridge. Then the other cap 21 is shoved on the body portion 20 of the cartridge, seating its flange 56 in the other circular groove 55 of the spool.

When the spool in the cartridge is to be used as a take-up spool in a camera, the cartridge is positioned in the camera and the driving key or other driving mechanism is engaged in one end of the bore 52 of the spool. Then the lead end of the film F from the supply spool or cartridge of the camera is inserted through the mouth of the body portion of the cartridge as shown in Fig. 12, and the spool is rotated clockwise by the key or other driving mechanism of the camera so as to bring the hooks 74 into engagement with perforations 80 in the film. As the film winds on the camera, the hook member is depressed to the dotted line position indicated at 70' in Fig. 7. After a sufficient amount of film has been wound on the take-up spool to bring an unexposed portion of the film into picture taking position a picture can be taken. After taking a picture, the film is further wound by rotating the spool in the usual manner. The film winding on the spool wraps over and around the hook member.

After all of the film has been exposed, the whole cartridge can be removed from the camera, and a new cartridge positioned therein, or the cartridge, which has previously been used as the supply cartridge, can be shifted to the take-up position in the camera and a new cartridge loaded with film can be introduced into the supply position in the camera. The cartridge with the exposed film therein is light-tight and provides a ready case for keeping or shipping the film until it can be developed. To remove the spool with the exposed film thereon from the cartridge all that is necessary to do is to remove one of the caps 21 and lift the spool out. This can be done readily in the dark. A new spool with unexposed film thereon can just as readily be placed in the cartridge in the dark, and the cap, which has been removed, can then readily be replaced.

The cartridge or cassette of the present invention has definite advantages for both military and civilian purposes because it permits daylight loading and unloading of the camera in the field due to the light-tight protection of the film. Further, when a roll of exposed film has been wound on the spool in the cartridge, the film is securely protected, and can safely be sent to a developing point. Furthermore, with the present cartridge it is not necessary to provide film with a long leader or a long trailer. This reduces winding time, both before and after exposure, to a minimum; the camera is ready for picture taking almost by loading it with the cartridge. Moreover, the film spool is designed so that it can be engaged on either end with the driving key of the camera for rotation in either direction. The cartridge, however, has to be inserted in the camera in the proper direction to have the film properly in the exposure opening.

By making the hook member of a single stamping, the structure is very much simplified as compared with prior constructions; and its cost is kept at a minimum.

While the invention has been described in connection with a specific embodiment thereof, it will be understood that it is capable of further modification, and this application is intended to cover any variations, uses, or adaptations of the invention following, in general, the principles of the invention and including such departures from the present disclosure as some within known or customary practice in the art to which the invention pertains and as may be applied to the essential features hereinbefore set forth and as fall within the scope of the invention or the limits of the appended claims.

Having thus described our invention, what we claim is:

1. A film spool for photographic use comprising a rotary body having angularly spaced recesses around its periphery, a member resiliently embracing the periphery of said body and having inturned portions at its ends resiliently engaging said recesses to resiliently hold said member on said body and a resilient arm secured to said member normally to project outwardly from the periphery of said body, said arm carrying a hook at its free end for engagement with perforated film.

2. A film spool for photographic use comprising a rotary body having angularly spaced recesses around its periphery, a resilient sheet member having an arcuate gripping portion terminating in inturned ends, said gripping portion having a normal curvature between said ends of less radius than the radius of the periphery of said body, whereby when said gripping portion is mounted on said body with its inturned ends engaging in said spaced recesses said gripping portion will be resiliently held on said body, and an arm integral with said gripping portion and arcuately curved on an arc whose radius is normally greater than the radius of said gripping portion whereby said arm normally projects resiliently away from said gripping portion, said arm terminating in a film-engaging hook.

3. A film spool for photographic use comprising a rotary body, and a thin resilient film-engaging member, said film-engaging member having a gripping portion normally curved on an arc of smaller radius than the radius of the peripheral surface of said body, whereby when the gripping portion of said member is snapped over said body it will resiliently grip said body, and said member having an integral arm normally projecting away from said gripping portion and carrying a film-engaging hook.

4. A film spool for photographic use comprising a rotary body, and a thin sheet-metal film-engaging member, said body having at least three angularly-spaced recesses around its periphery, and said film-engaging member having a resilient gripping portion normally curved on an arc of smaller radius than the radius of the peripheral surface of said body and provided with at least two integral, inwardly-directed lugs spaced apart a distance to engage in two of said recesses when the gripping portion of said member is snapped over said body whereby said member will be held resiliently on said body with its lugs in engagement with said two recesses, and said member having an integral arm normally projecting resiliently away from its gripping portion and curved on an arc of greater radius than said gripping portion, said arm having an integral, inwardly-directed lug adapted to engage in the third recess in said body when said arm is pressed resiliently against said body, and said arm having also an integral, outwardly-directed film-engaging hook.

5. A film-engaging member for use with a film spool comprising a thin, resilient gripping portion curved normally on an arc whose radius is less than the peripheral radius of the spool, whereby when said gripping portion is snapped over said spool it will be resiliently retained thereon, an integral arm normally projecting away from said gripping portion, and an integral hook carried by said arm.

6. A film-engaging member for use with a film spool comprising a thin, resilient sheet-metal gripping portion curved normally on an arc whose radius is less than the peripheral radius of the spool, whereby when said gripping portion is snapped over said spool it will be resiliently retained thereon, an integral arm normally projecting away from said gripping portion, and an integral hook carried by said arm, said arm being normally curved on a radius greater than the radius of said gripping portion.

7. A film-engaging member for use with a film spool which is provided with a plurality of spaced peripheral recesses, said member comprising a thin, resilient sheet-metal gripping portion curved normally on an arc whose radius is less than the peripheral radius of the spool, whereby when said gripping portion is snapped over said spool it will be resiliently retained thereon, an integral arm normally projecting away from said gripping portion, and an integral hook carried by said arm, said gripping portion having a plurality of integral inwardly-directed lugs adapted to engage in a plurality of said peripheral recesses of said spool to hold said member against rotation on said spool.

8. A film-engaging member for use with a film spool which is provided with a plurality of spaced peripheral recesses, said member comprising a thin, resilient sheet-metal gripping portion curved normally on an arc whose radius is less than the peripheral radius of the spool, whereby when said gripping portion is snapped over said spool it will be resiliently retained thereon, an integral arm normally projecting away from said gripping portion, and an integral hook carried by said arm, said arm being normally curved on a radius greater than the radius of said gripping portion, said gripping portion having two integral inwardly-directed lugs adapted to engage in two of the peripheral recesses of said spool to hold said member against rotation on said spool, and said arm having an integral inwardly-directed lug adapted to engage in a third of said peripheral recesses of said spool, said third recess being spaced angularly about the periphery of the spool from the two recesses engaged by the first-named lugs.

References Cited in the file of this patent

UNITED STATES PATENTS

| | | |
|---|---|---|
| 620,777 | Hoskin | Mar. 7, 1899 |
| 1,799,748 | Hayden | Apr. 7, 1931 |
| 1,899,279 | Lessler | Feb. 28, 1933 |
| 1,966,347 | Hughey | July 10, 1934 |
| 2,153,573 | Kinloch | Apr. 11, 1939 |
| 2,487,479 | Roehrl | Nov. 8, 1949 |
| 2,616,634 | Melkon | Nov. 4, 1952 |